United States Patent [19]
Woodall

[11] Patent Number: 5,694,375
[45] Date of Patent: Dec. 2, 1997

[54] ULTRA-BROADBAND HYDROPHONE

[75] Inventor: Roger L. Woodall, Jewett City, Conn.

[73] Assignee: The United States of America as represented by the Secretary of the Navy, Washington, D.C.

[21] Appl. No.: 624,833

[22] Filed: Mar. 22, 1996

[51] Int. Cl.$^6$ .................................................. H04R 11/00
[52] U.S. Cl. ............................................................ 367/185
[58] Field of Search ................................ 367/185, 174, 367/149, 142, 140, 186, 187; 310/337, 334

[56] References Cited

U.S. PATENT DOCUMENTS 3,768,069  10/1973  Abbagnaro ........................... 367/174

Primary Examiner—Daniel T. Pihulic

Attorney, Agent, or Firm—Michael J. McGowan; Prithvi C. Lall; Michael F. Oglo

[57] ABSTRACT

The present invention relates to an ultra-broadband hydrophone which has two major electronic components and one mechanical component. The first electronic component comprises a flux-gate magnetometer for sensing changes in an ambient magnetic field and for creating an electrical signal representative of the ambient magnetic field. The second electronic component comprises an electrical circuit for demodulating the electrical signal and a low pass filter for smoothing the demodulated signal. The mechanical component is a magnetic diaphragm for receiving acoustic pressure waves and for causing changes in the ambient magnetic field in response to the received acoustic pressure waves. In a preferred embodiment, the hydrophone of the present invention also includes a sub-Hertz differential magnetic field winding for generating a differential magnetic field which nulls the ambient magnetic field about the flux-gate magnetometer.

9 Claims, 3 Drawing Sheets

ULTRA-BROADBAND HYDROPHONE

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

The present invention relates to an extremely broadband acoustic hydrophone device.

(2) Description of Prior Art

Classical acoustic hydrophones for ship sonar use relatively large mass piezoelectric materials for the conversion to electrical energy. This piezoelectric mass has mechanical resonances and acoustic impedances that alter its responses to acoustic waves. The classic hydrophones operate in bandwidths less than two decades of frequencies. The ultra-broadband hydrophone does not suffer from either of these anomalies or a thermal noise limit except for its electronic circuits.

SUMMARY OF THE INVENTION

Accordingly, it is a principal object of the present invention to provide a hydrophone which operates over a broad band of frequencies.

It is a further object of the present invention to provide a hydrophone as above which lends itself to a wide variety of configurations.

It is still a further object of the present invention to provide a hydrophone as above which has increased sensitivity.

The foregoing objects are attained by the ultra-broadband hydrophone of the present invention which has a first means for sensing an acoustic wave having changes (increases and decreases) in pressure relative to the ambient pressure. The acoustic wave pressure sensing means comprises magnetic means for causing a magnetic field to move synchronously. Preferably, the magnetic means is a flexible diaphragm having magnetic particles, which particles when contacted by the pressure of an acoustic wave cause changes in the ambient magnetic field. The hydrophone further has second means for sensing flux changes in the ambient magnetic field and for generating an electrical signal representative of the ambient magnetic field. Preferably, the flux change sensing means comprises a flux-gate magnetometer.

The hydrophone of the present invention further has means for generating an output signal. The output signal generating means includes means for demodulating the electrical signal representative of the ambient magnetic field and a low pass filter for smoothing out the demodulated electrical signal.

In a preferred embodiment of the present invention, the hydrophone further comprises means for generating a differential magnetic field for nulling the magnetic field at the flux change sensing means. It has been found that providing a differential magnetic field causes an increase in the sensitivity of the hydrophone by operating the flux change sensing means in its most linear point.

Other details of the present invention, as well as other objects and advantages attendant thereto, are set forth in the following detailed description and the accompanying drawings wherein like reference numerals depict like elements.

DESCRIPTION OF THE PREFERRED EMBODIMENT

Figure 1:
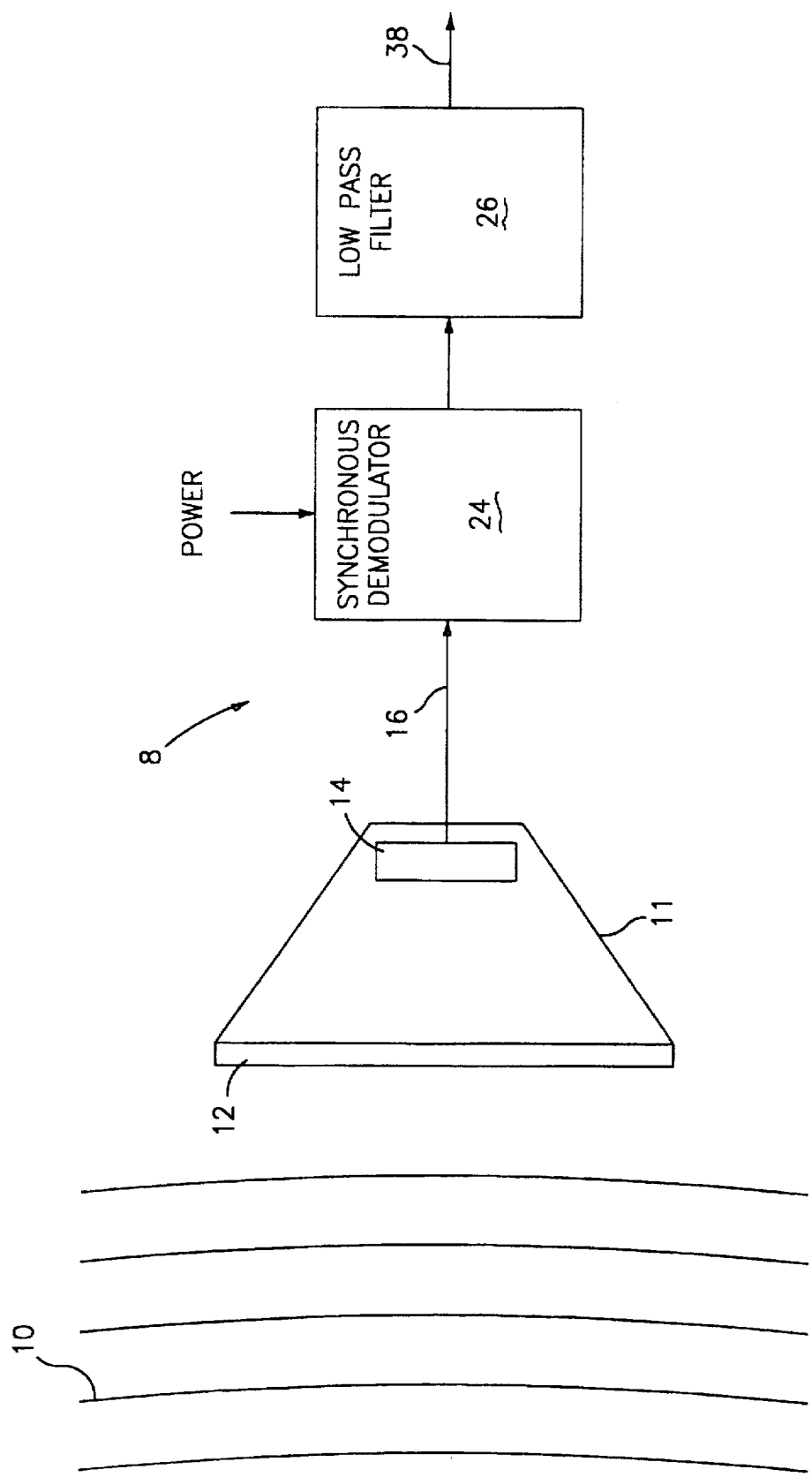
FIG. 1 is a schematic representation of a first embodiment of a hydrophone in accordance with the present invention.

Referring now to FIG. 1, an ultra-broadband hydrophone 8 in accordance with the present invention has two major electronic components and one mechanical component. The first electronic component comprises a flux-gate magnetometer 14, while the second electronic component comprises a circuit having a synchronous demodulator 24 and a low pass filter 26. The mechanical component comprises a magnetic diaphragm 12.

Figure 2:
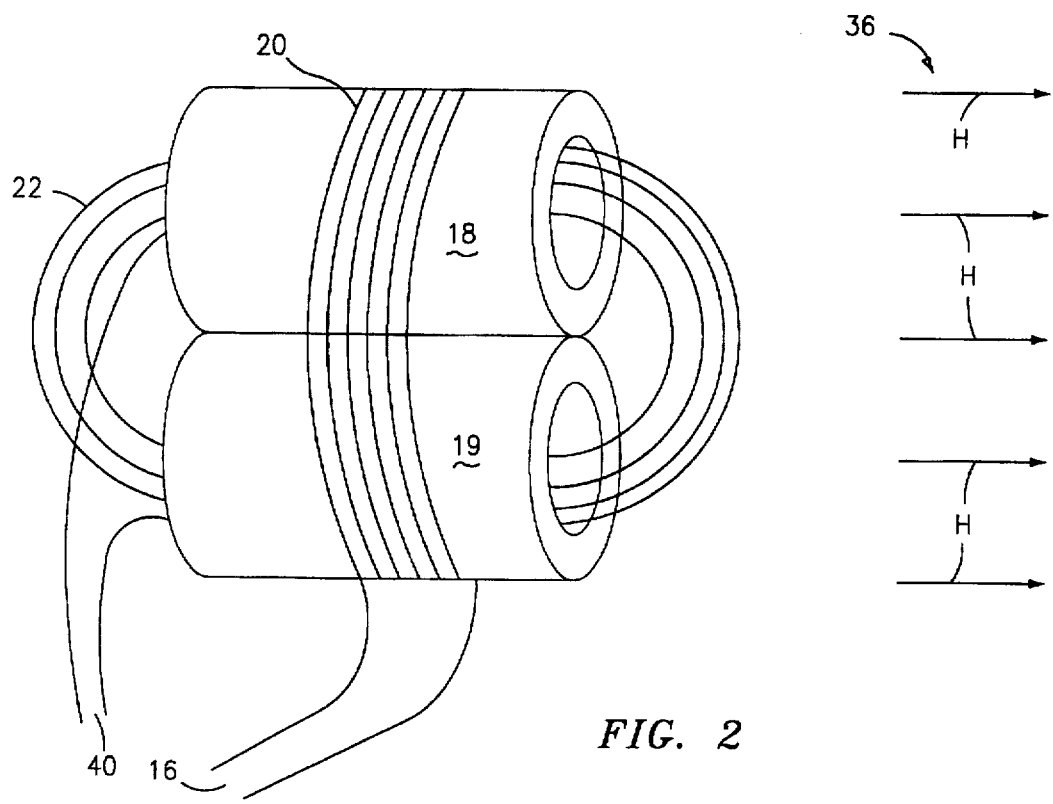
FIG. 2 illustrates a flux-gate magnetometer used in the hydrophone of the present invention.
Figure 3:
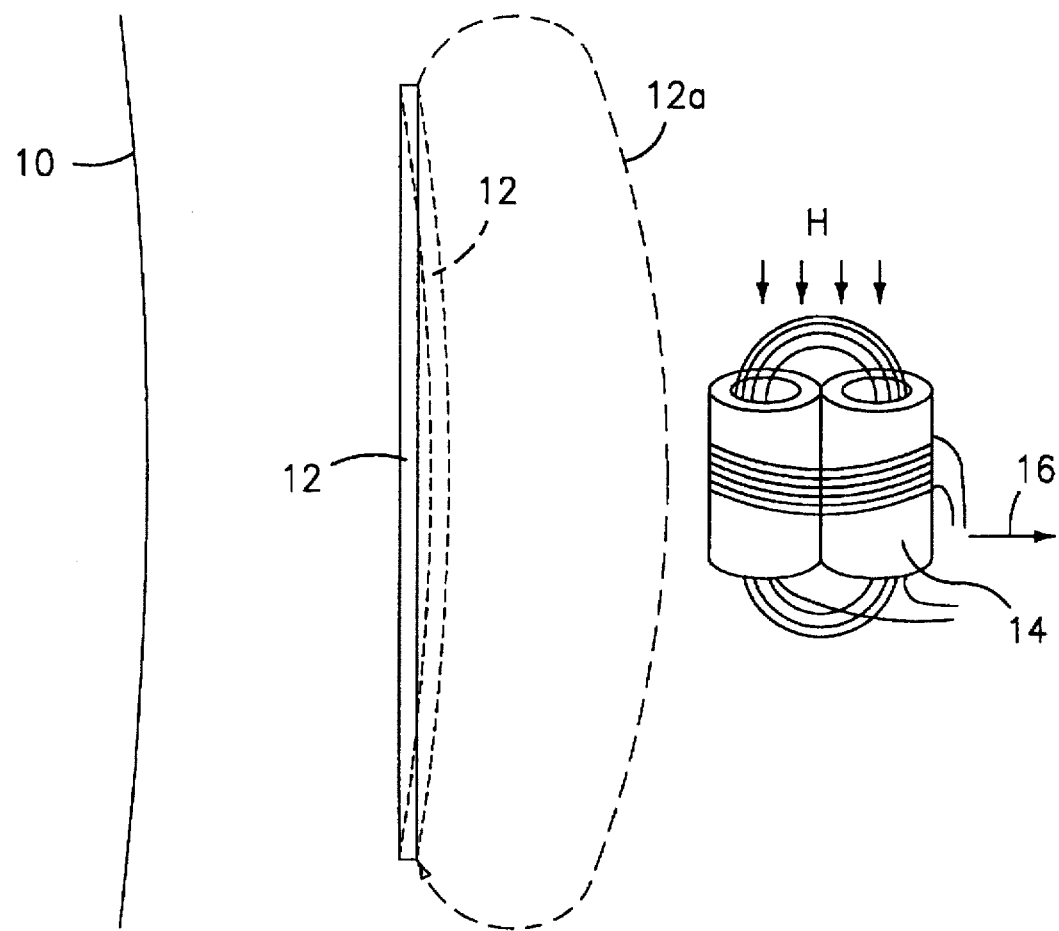
FIG. 3 illustrates the manner in which acoustic wave pressure is transformed into an electrical signal.

The operation of the ultra-broadband hydrophone of the present invention can be seen from FIGS. 1 through 3. Sound wave pressures 10, when changing about the ambient pressure, produce vibrations in the magnetized diaphragm 12 which causes the diaphragm to flex. This in turn causes the ambient magnetic field about the diaphragm to move synchronously to the altered position 12a shown in dotted lines in FIG. 3. Slight increases and decreases in the flux H of the ambient magnetic field produce a change in an AC signal 16 generated by the flux-gate magnetometer 14. Thereafter, the AC signal 16 is demodulated synchronously by demodulator 24 and filtered by filter 26 to convert the fluctuating input acoustic wave pressure to an electric output signal 38.

The flux-gate magnetometer 14 used in the hydrophone of the present invention has a sensitivity vying a superconducting SQUID and can be made into an extremely small package. Additionally, it is a sensing device that is many magnitudes more economical than a superconducting SQUID. The magnetometer 14 is also a sensor that has the sensitivity to measure changes in the earth's magnetic flux.

As shown in FIG. 2, the flux-gate magnetometer 14 used in the hydrophone of the present invention is a device composed of two orthogonal magnetic windings 20 and 22 wound on two ferrite cores 18 and 19. The output signal 16 of the magnetometer is an AC signal that has an amplitude and phase relative to the strength and direction of the ambient magnetic field. The output signal 16 is obtained through repetitive saturations of the ferrite cores 18 and 19 driven by a high frequency bias current 40 passed through the winding 22. The current 40 may be produced by any suitable current source (not shown) known in the art. Changes in these saturations are sensed by the sensing winding 20 which is orthogonal to winding 22 to null any magnetic field created by the bias current. The sensing winding 20 produces no output signal when there is no external magnetic field. In an applied magnetic field 36 that is perpendicular to the sensing winding 20 and orthogonal to winding 22, the vector of the magnetic flux H passes through the two ferrite cores 18 and 19 and the sensing winding 20. When the ferrite cores 18 and 19 are saturated by the bias current 40, the flux of the magnetic field 36 is blocked from passing through the ferrite cores 18 and 19 and the sensing winding 20. Thus the sensing winding 20 induces the presenting and absenting of the applied magnetic field 36 to produce the AC output signal 16, which signal has an amplitude and phase relative to the magnetic field's strength and direction. The applied magnetic field 36 is sampled twice per cycle of the high frequency bias current to produce an output frequency that is twice the frequency of the bias current.

As previously discussed, the second electric component comprises a synchronous demodulator 24 and a low pass filter 26. Preferably, the filter 26 has a cutoff frequency below the bias frequency. If one assumes that there is a continuous positive pressure 10 on the magnetic diaphragm 12, as shown in FIG. 3, that produces a steady AC output signal 16 from the flux-gate magnetometer 14, the demodulation of the AC output signal 16 is synchronous to its own output frequency. The low pass filter 26 smoothes the demodulated signal to a plus or minus DC signal as a function of the magnitude and direction of the ambient magnetic field. Therefore, a steady pressure produces a steady DC output signal 38 and a fluctuating pressure will cause a fluctuating output electrical signal 38. It can be seen from the foregoing that an acoustic input will be reproduced in frequency and magnitude in the filtered output.

The magnetized diaphragm 12 is a passive mechanical component that is a highly flexible light diaphragm impregnated with fine grain magnetic particles. The diaphragm may be formed from any suitable rubber-like flexible material known in the art. Similarly, the magnetic particles may be any magnetic particles known in the art such as iron, nickel, rare earth and cobalt particles. Preferably, the magnetic particles are aligned magnetically in the same direction as the response axis of the flux-gate magnetometer 14. The diaphragm 12 and the magnetometer may be encased in any suitable structure 11 as shown in FIG. 1.

The hydrophone of the present invention can sense acoustic energy from a lower frequency of zero Hertz to an upper frequency limit where the hydrophone's magnetic diaphragm 12 is no longer capable of being moved by the acoustic energy. It has been found that the physical and electrical laws of this device allow a transducer operating frequency range from DC to above 100 Khz.

Figure 4:
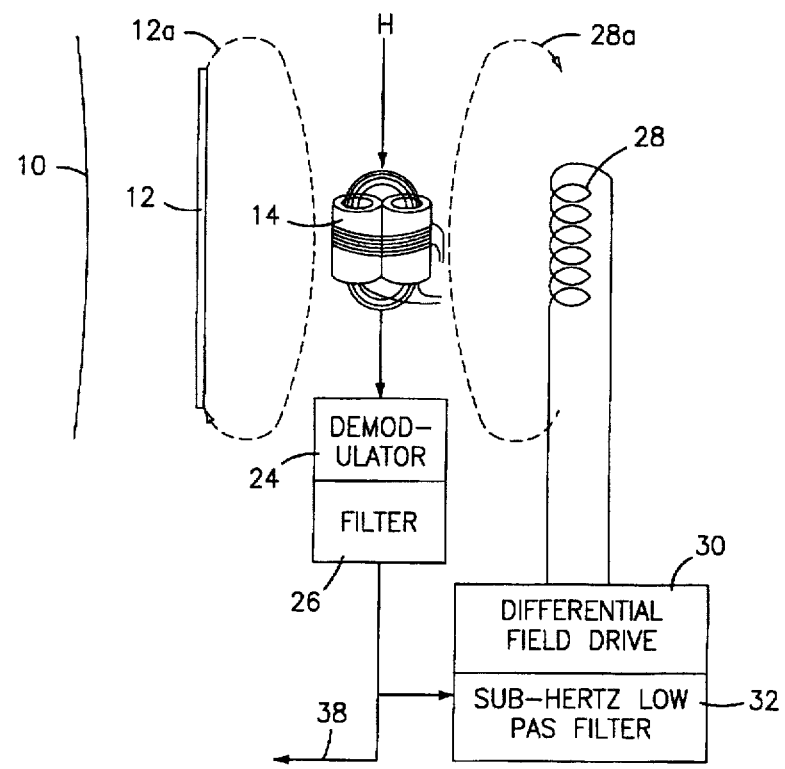
FIG. 4 is a schematic representation of a second embodiment of a hydrophone in accordance with the present invention.

A preferred embodiment of the ultra-broadband hydrophone of the present invention is shown in FIG. 4. This embodiment includes a sub-Hertz differential magnetic field winding 28, a sub-Hertz low pass filter 32 and a differential field driver 30. The differential magnetic field 28a produced by the winding 28 is used to null the flux H of the magnetic field 12a at the flux-gate magnetometer 14. This action increases the sensitivity of the hydrophone 8 by operating the flux-gate magnetometer 14 in its most linear point. This action also compensates for the earth's magnetic field and for local steady or slow changing stray magnetic fields. In operation, the sub-Hertz low pass filter 32 senses the average voltage of the hydrophone's electrical output signal 38 and inputs the average voltage to the differential field driver 30. Through a negative feedback mode, the differential field driver 30 controls the direction and level of the differential magnetic field 28a to null the average magnetic field 12a at the flux-gate magnetometer 14.

The ultra-broadband hydrophone of the present invention may be constructed in a variety of different configurations. For example, it can be constructed as a cylindrical hydrophone, a thin plate array of hydrophones, a conformal array of hydrophones, a thin array of hydrophones, and a very small hydrophone. If desired, the ultra-broadband hydrophone can be constructed with a rigid fixed magnet behind the flux-gate magnetometer to null the magnetic field at the flux-gate magnetometer. The removal of the magnetic bias at the flux-gate magnetometer from the diaphragm's field will increase the hydropohone's sensitivity by moving the flux-gate magnetometer's operation toward the most linear part of the saturation curve.

The effect of motion and the earth's magnetic field can be decoupled from the output of the ultra-broadband hydrophone causing a very slight frequency increase at the zero Hertz response point.

The ultra-broadband hydrophone of the present invention can be used in air as a microphone.

There are numerous advantages attendant to the hydrophone of the present invention. For example, it has an increased operating bandwidth. It also has an increased operating sensitivity. Still further, it can be scaled in size. Yet another advantage is that it has no thermal noise limit except for the electronics that can be optimized for a minimum effect.

It is apparent that there has been provided in accordance with this invention an ultra-broadband hydrophone which fully satisfies the objects, means and advantages set forth hereinbefore. While the invention has been described in combination with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. An acoustic ultra-broadband hydrophone device which comprises:

first sensing means for sensing an incoming acoustic wave producing changes in ambient pressure, said first sensing means including a magnetic diaphragm producing vibrations in response to said changes in ambient pressure due to said incoming acoustic wave and causing changes in ambient magnetic field produced by said vibrations of said diaphragm to move synchronously with said changes in ambient pressure and producing corresponding changes in magnetic flux; and second means for sensing said changes in magnetic flux and generating electrical signals representative of said changes in magnetic flux.

2. The hydrophone device of claim 1 wherein said magnetic diaphragm comprises a flexible light diaphragm impregnated with fine grain magnetic particles, said particles being aligned magnetically in the same direction as a response axis of said second sensing means.

3. The hydrophone device of claim 2 wherein said second sensing means comprises a flux-gate magnetometer.

4. The hydrophone device of claim 3 wherein said flux-gate magnetometer comprises:

two ferrite cores;

a saturation winding passing through said ferrite cores and being arranged orthogonal to said sensing winding;

a sensing winding wound about said ferrite cores and being arranged orthogonal to said saturation winding; and whereby a high frequency bias current is passed through said saturation winding and changes in saturations are sensed by said sensing winding.

5. The hydrophone device of claim 4 wherein the electrical signal produced by said magnetometer is an AC signal that has an amplitude and phase relative to the ambient magnetic field's strength and direction.

6. The hydrophone device of claim 2 further comprising:
means for generating an output signal;
said output signal generating means comprising means for demodulating said electrical signal generated by said second sensing means; and
said output signal generating means further comprising means for filtering said demodulated signal.

7. The hydrophone device of claim 6 wherein said filtering means smoothes the demodulated signal to a DC output signal which is a function of the magnitude and direction of the ambient magnetic field.

8. The hydrophone device of claim 6 further comprising means for generating a differential magnetic field for nulling the ambient. magnetic field at said second sensing means and increasing the sensitivity of said hydrophone device.

9. The hydrophone device of claim 8 wherein said differential magnetic field generating means comprises:

a sub-Hertz differential magnetic field winding;

a differential field driver; and a sub-Hertz low pass filter for sensing the average voltage of said output signal and inputting the sensed average voltage to the differential field driver for generating said differential magnetic field.

* * * * *